(12) United States Patent
Hansen

(10) Patent No.: US 6,439,545 B1
(45) Date of Patent: Aug. 27, 2002

(54) MOTORIZED JACK FOR TRAILERS

(76) Inventor: Fredrick M. Hansen, 40102 N. Circle Ave., Antioch, IL (US) 60002

( * ) Notice: Subject to any disclaimer, the term of this patent is extended or adjusted under 35 U.S.C. 154(b) by 0 days.

(21) Appl. No.: 09/638,431

(22) Filed: Aug. 14, 2000

(51) Int. Cl.[7] .................................................. B60S 9/02
(52) U.S. Cl. ........................ 254/420; 254/418; 254/419; 254/425
(58) Field of Search ................................ 254/420, 419, 254/418, 424, 425; 180/13, 65.5, 14.2

(56) References Cited

U.S. PATENT DOCUMENTS

| | | | | |
|---|---|---|---|---|
| 3,356,172 A | * | 12/1967 | Peckham et al. | 254/420 |
| 5,282,605 A | * | 2/1994 | Sauber | 254/420 |
| 5,421,555 A | * | 6/1995 | Sims | 254/420 |

* cited by examiner

Primary Examiner—Joseph J. Hail, III
Assistant Examiner—Lee Wilson
(74) Attorney, Agent, or Firm—Leydig, Voit & Mayer, Ltd.

(57) ABSTRACT

A motor-driven trailer swivel jack is described that includes a detachable steering assembly. The steering assembly is fastened to the jack by both electrical and mechanical fasteners. The mechanical fastener allows the steering assembly to freely pivot in the vertical direction, which allows the user to maintain a grip on the steering as the jack moves over rough terrain. The mechanical fastener provides a rigid connection in the horizontal direction, which allows steering forces to be transferred to the jack without loss. The electrical connector is mounted between the motor and its power source. All the wiring necessary to connect the motor to the power source and the switch to control the motor is located in, or attached to, the removable steering assembly. When the steering assembly is removed, the de-energized motor effectively brakes the wheel of the jack, which complements the absence of a steering mechanism to make the jack difficult to accidentally move or tamper with.

14 Claims, 6 Drawing Sheets

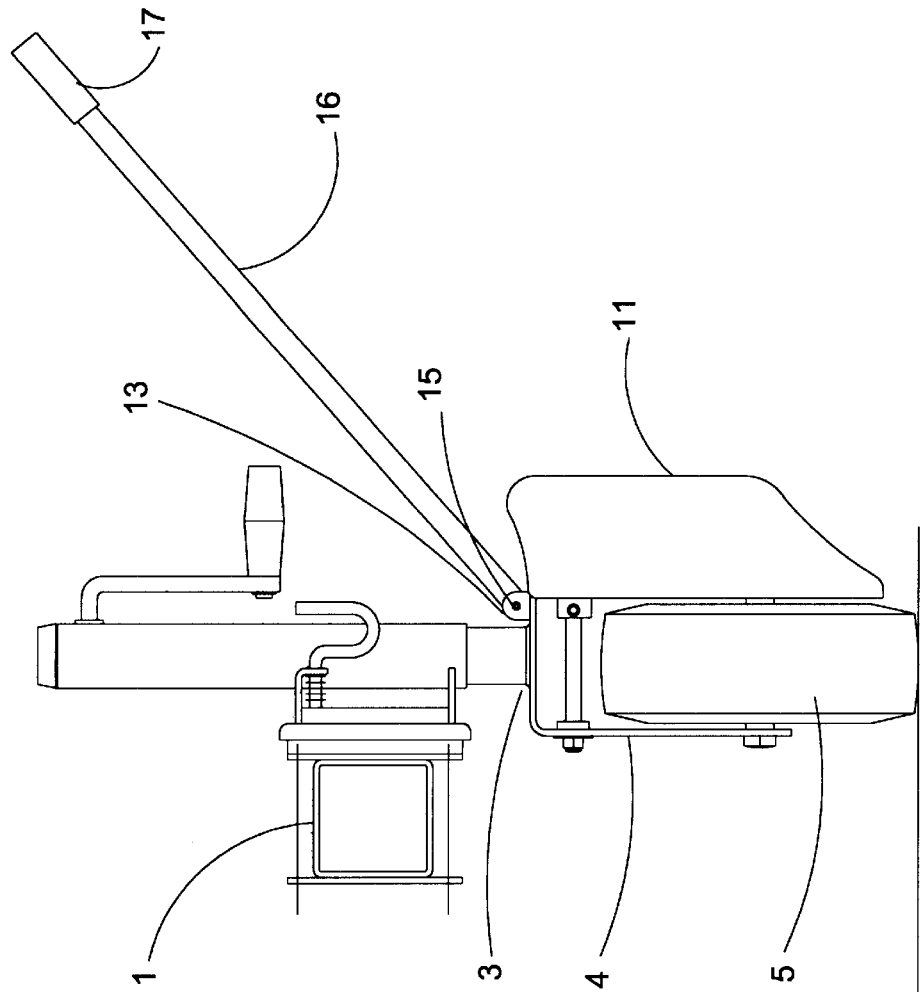
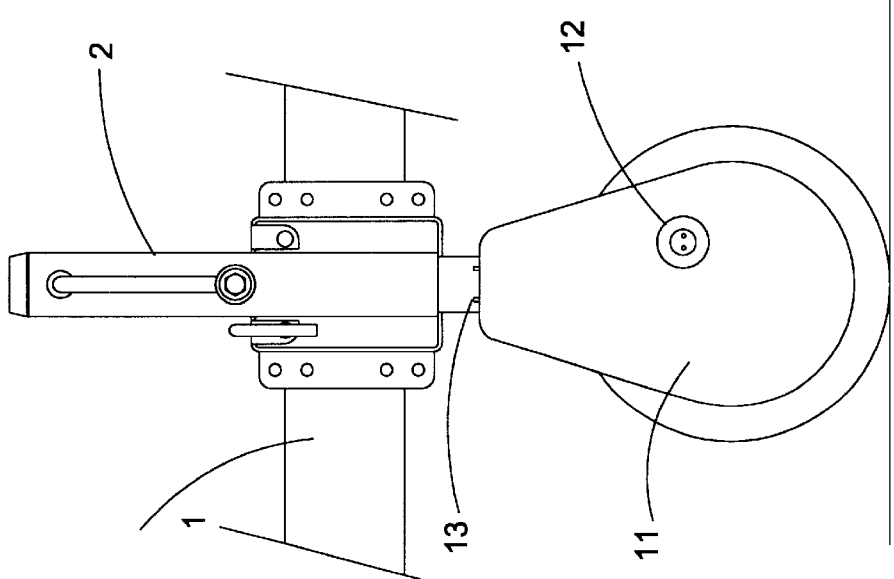

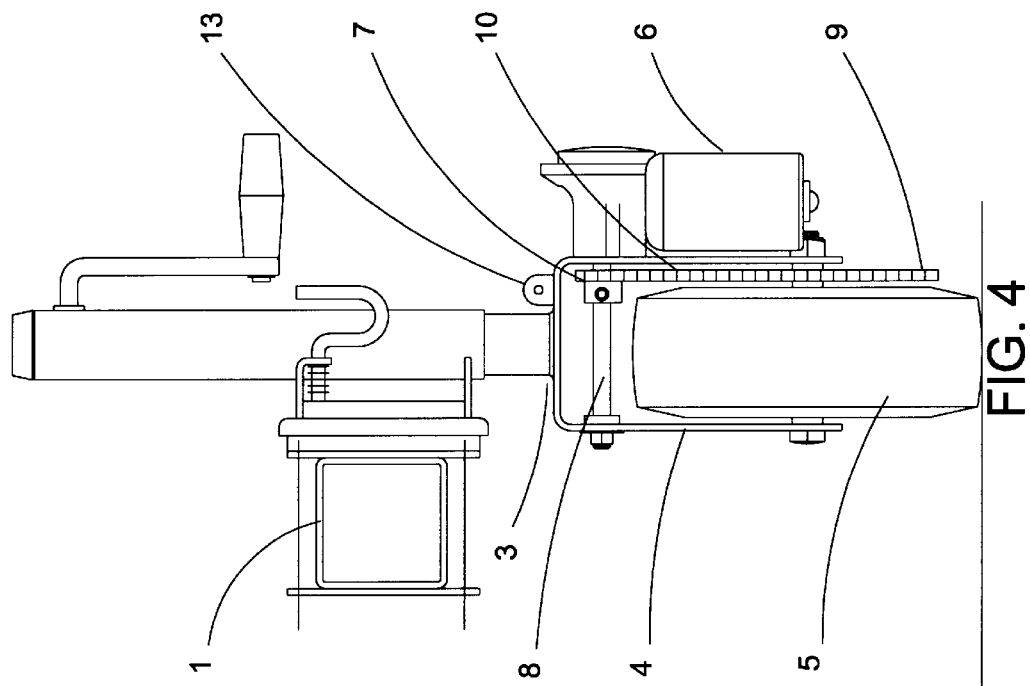
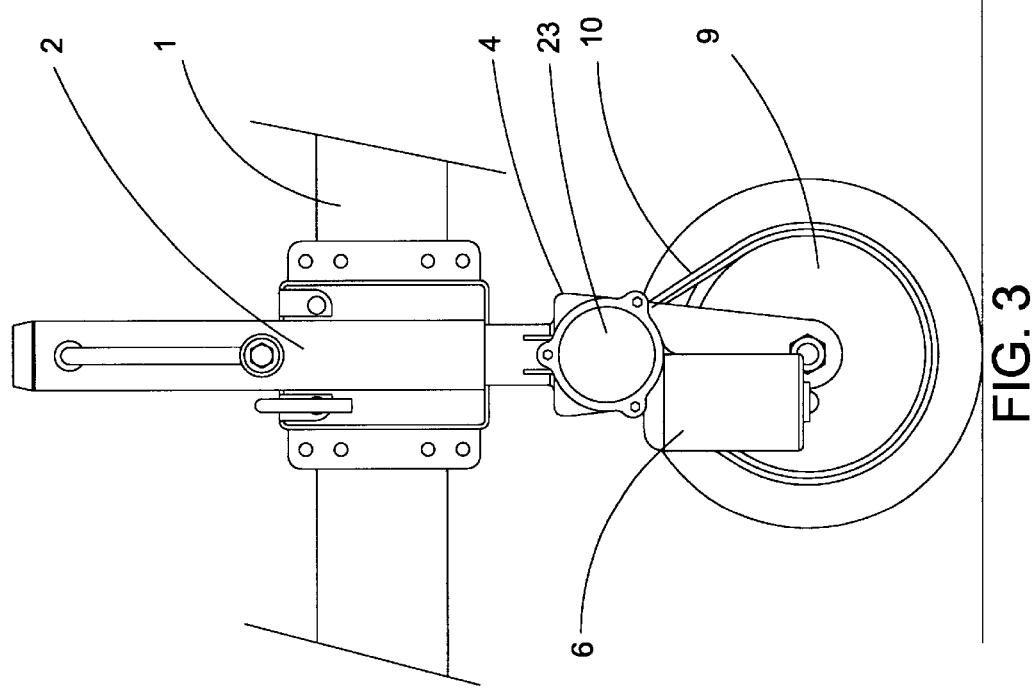

MOTORIZED JACK FOR TRAILERS

TECHNICAL FIELD

This invention relates generally to electromechanical drives for facilitating the manual movement and positioning of a trailer after the trailer is uncoupled from a towing vehicle and more particularly to wheeled jacks for supporting trailers at their tongues when they uncoupled from the towing vehicle.

BACKGROUND OF THE INVENTION

There are a variety of types of mechanisms for aiding the transport of a trailer uncoupled from its towing vehicle. One of the most common is the swivel jack.

Swivel jacks are typically pivotally mounted to the tongues of trailers. These jacks typically have wheels at their bases that support the trailer in place of the hitch of the towing vehicle. The jack provides a third support point that cooperates with the two ground support points provided by the conventional two wheels and axle of a trailer. In their simplest implementations, the jacks provide a third ground wheel so that the trailer can be manually pushed or pulled into a storage station or area. Often these areas require the trailer to be moved over surfaces that offer significant resistance to rotation of the trailer wheels, such as gravel or soft turf. An example of a hand-powered swivel jack is the model no. 372169 marine swivel jack, manufactured by Fulton Performance Products of Mosinee, Wis. www.fulton-preformance.com In order to make these swivel jacks easier to use, motors are sometimes added to them for the purpose of driving the wheel. An example of this type of adaptation of the swivel jack is found in U.S. Pat. No. 3,861,482 (hereinafter "the '482 patent"), which illustrates a power-driven swivel jack that is detachable from a trailer tongue. A steering arm attached to the body of the swivel jack in the '482 patent and allows the user to steer the trailer as it moves under the power of the jack. The steering arm extends transversely from the vertical pivot axis of the jack and is attached to the jack at a point such that the steering force is applied to the jack at the top of the jack and along the vertical pivot axis.

Even with power driven swivel jacks, it's difficult to steer the trailer by controlling a steering arm. Turning the wheel requires considerable force, particularly if the trailer is heavy and the road conditions are other than smooth and hard. In some jacks, this problem is addressed by making the wheel from a hard plastic with a relatively smooth tread. Although this solution makes the jack easier to steer, it compromises the traction of the wheel to the ground, making the driving of the wheel more difficult. Moreover, in the swivel jack illustrated in the '482 patent, the steering arm is mounted to the top of the jack, which provides the user with very little if any tactile information about the direction of the wheel as the trailer is steered.

None of these known swivel jacks have satisfactory and efficient steering assemblies and wheel mechanisms for easily moving and steering a trailer over rough terrain like gravel or soft turf. In addition, none of these jacks transmit substantially all of the torque for turning and steering the swivel jack to the wheel fork assembly, making the manual steering of the jack sometimes difficult. For example, the swivel jack of the '482 patent applies the torque for steering the wheel of the jack at the extreme end of the jack opposite the wheel. Thus, some of the torque is taken up in the torsion of the jack caused by the opposing forces at the ends of the jack—i.e., the torque applied at the top of the jack by the steering arm and frictional resistance to it at the interface between the wheel and the ground. This remoteness of the steering force to the resistance it must overcome gives the user a feel that the steering is not nimble and or sluggish in responding to changes in the magnitude or direction of the force applied to the steering arm.

SUMMARY OF THE INVENTION

In accordance with the invention, a trailer swivel jack is provided with a steering assembly for maneuvering the power driven jack in a manner that provides the user with a tactile sense of greater control than previously possible. The steering assembly is detachable from the jack by way of a quick release fastener, which allows the steering mechanism to be safely stored away when not being used. Moreover, the steering mechanism also includes a control switch for operating the motor driving the wheel of the jack. Like the mechanical connection of the steering assembly to the jack, the electrical connection between the jack and the assembly is also of a quick release type. Thus, with the steering assembly removed, the jack cannot be powered, which locks the wheel in place.

Additional features and advantages of the invention will be made apparent from the following detailed description of illustrative embodiments that proceeds with reference to the accompanying Figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 1 is a side view of a swivel jack according to the invention bolted to the trailer tongue of a standard trailer with the removable steering assembly and motor casing attached;

FIG. 2 is a front view of the swivel jack illustrated in FIG. 1;

FIG. 3 is the same side view of the swivel jack as illustrated in FIG. 1, except the casing for the motor has been removed to expose the motor and its associated transmissions;

FIG. 4 is a front view of the swivel jack illustrated in FIG. 3;

DETAILED DESCRIPTION OF THE INVENTION

Figure 5:
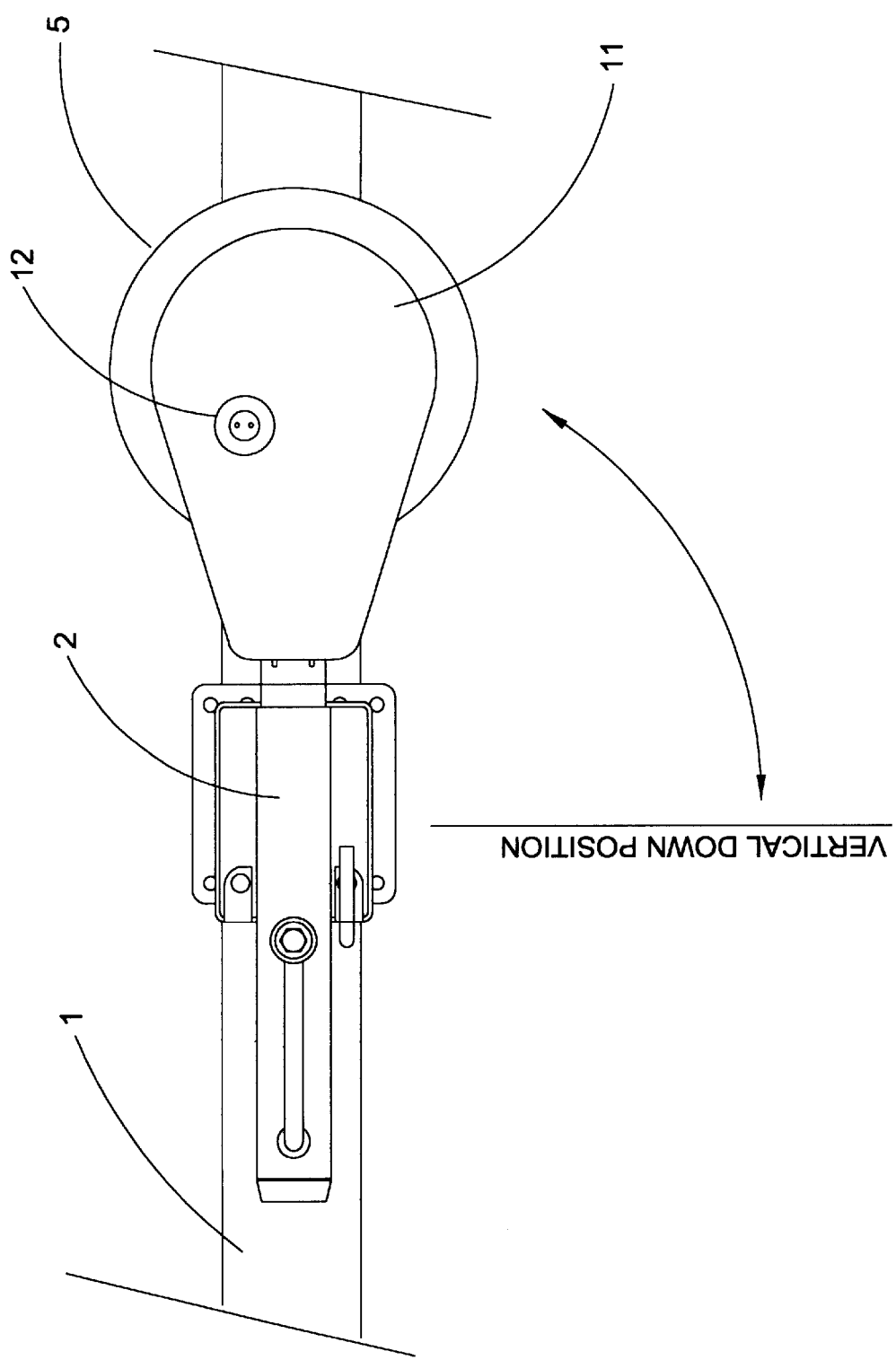
FIG. 5 is a side view of the swivel jack of FIGS. 1–4 pivoted into out-of-operation position.

Turning to the drawings and referring first to FIGS. 1 through 4, wherein like reference numerals refer to like elements, the invention is illustrated as an enhancement to an otherwise conventional marine swivel jack, such as the model 372169 swivel jack manufactured by Fulton Performance Products of Mosinee, Wis. In a well-known manner, the jack is attached to the tongue 1 of a trailer at an area proximate the tongue's distal end. A hollow support cylinder 2 attaches to the tongue 1 in a conventional manner and need not be explained in detail herein.

In keeping with the conventional design of wheeled jacks, the support cylinder receives a vertical post 3 of a fork assembly 4 for supporting a pneumatic tire and wheel assembly 5. A twelve-volt electric motor 6 with worm drive and speed reducing transmission 23 is mounted to the fork assembly 4, as best illustrated in FIGS. 3 and 4. The transmission serves two functions. First, it takes the output of the rotating motor shaft and turns it 90 degrees. Second, it reduces the rpm of the shaft. A small diameter chain sprocket 7 is mounted to the motor worm drive shaft 8. A larger diameter chain sprocket 9 is mounted to the pneumatic wheel and tire 5. The small and large diameter sprockets 7 and 9, respectively, are coupled by chain 10. This sprocket arrangement further reduces the speed of the wheel and tire assembly. Depending on the motor used, one skilled in the art of designing these types of jacks will appreciate that variations in this transmission arrangement are within the designs contemplated by the invention. The transmission reduces the rpm of the motor to provide a ground speed of about 26 feet per minute.

The motor 6 is a twelve-volt DC electric motor. The motor 6 is energized by a power source that is located on the trailer, boat, or towing vehicle. In one embodiment of this invention, the motor is one that is conventionally used in an electrically powered anchor winch. An example of such a motor is the motor included in the Power Winch 24 produced by Power Winch of Harrison, Ohio. An important safety aspect of the invention is that when the motor 6 is not energized, the transmission 23 acts as a brake. Those skilled in the art will recognize that the nature of the worm gear transmission 23 only allows the motor 6 to turn the transmission and actuate the wheel 5. The wheel 5 cannot roll without being rotated by the transmission 23. Therefore, the transmission 23 can turn the wheel 5, but the wheel 5 cannot turn the transmission 23. Consequently, The jack can move neither forward nor backward absent power. With the transmission acting as a brake, the jack cannot move when there is no power reaching the motor.

Returning to FIGS. 1 and 2, a cover 11 made of plastic, fiberglass or other similar lightweight but sturdy material encloses the motor 6, chain 10, and the sprockets 7 and 9. An electrical receptacle 12 is mounted on the cover 11. Electrical wires connect the motor 6 to the receptacle 12. In a specific embodiment, the receptacle and corresponding male mating plug are watertight deck connections, such as the watertight deck connection receptacle and mating plug model 190-DR-CHR manufactured by Perko.

FIG. 5 depicts the swivel jack in the pivoted out-of-operation position. Along the lines of conventional marine swivel jacks, the support post 3 that attaches the swivel jack to the trailer can be pivoted. It pivots ninety degrees from the towing vertical position, pictured in FIGS. 1 though 4, to the horizontal position pictured in FIG. 5. The mounting assembly allows the swivel jack to be pivoted into a position that runs parallel to the trailer, thus maximizing ground clearance. The pivoting is accomplished by a part of the mounting assembly that is not illustrated in detail because it is a conventional feature to wheeled jacks, such as marine jack model 372169 by Fulton Performance Products.

In accordance with one important aspect of the invention, a steering assembly 16 is detachably fastened to the fork assembly 4, which enables a user of the jack to directly steer the tire and wheel assembly 5 without the tactilely sensed lost motion in the steering resulting from torsion in the body of the jack when the steering force is introduced at a point on the jack remote from the wheel and tire assembly 5. The steering assembly 16 is mounted to the fork assembly 4 by way of a fastener 15 that allows for the quick release of the steering assembly when the jack is not in use.

Figure 8:
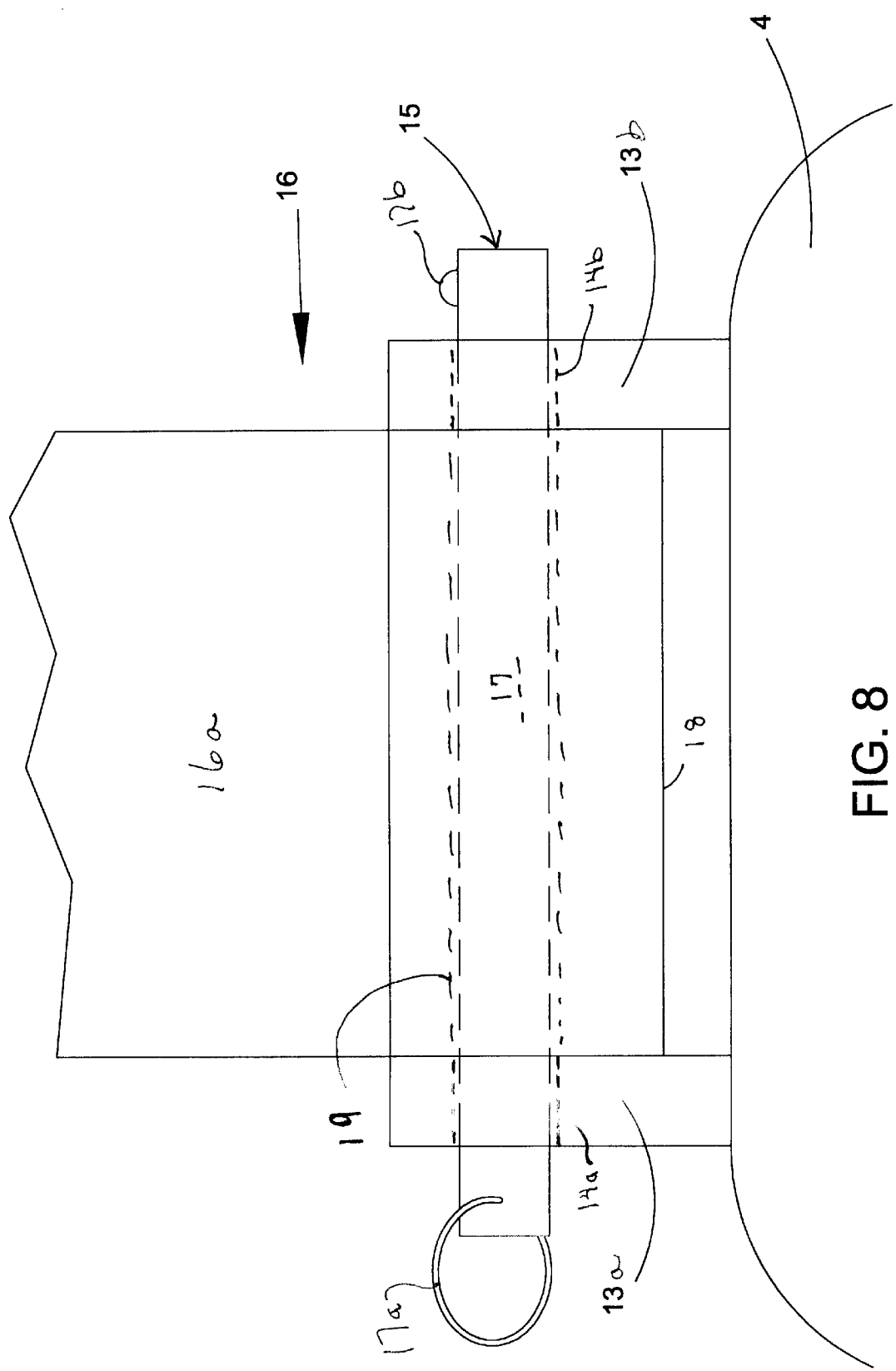
FIG. 8 is a close-up side view of the fastener assembly, where the steering assembly is attached to the fork assembly.

FIG. 8 represents a detailed view of the fastener 15 for the steering assembly 16. Two opposing flanges 13*a* and 13*b* are mounted to the top of the fork assembly 4. Each of the flanges 13*a* and 13*b* includes a bore 14*a* and 14*b*, respectively, that functions as a journal for a removable pin 17 of the fastener 15. In the illustrated embodiment, the opposing flanges 13*a* and 13*b* are separated by a distance slightly greater than a diameter of a cylindrically shaped column 16*a* of the steering assembly 16. The pin 17 may be a cotterless hitch pin such as the model no. 336-A, item 2456 by Hillman of Cincinnati, Ohio.

The distal end 18 of the column 16*a* is secured to the fork assembly 4 by the removable pin fastener 17. The distal end 18 of the steering column 16*a* is moved into the space between the two opposing flanges 13*a* and 13*b* and a bore 19 in the distal end of the column is aligned with the bores 14*a* and 14*b* in the flanges. With the bores 14*a*, 14*b* and 19 in alignment, the removable pin 17 slides through the bores, thereby fastening the steering column 16*a* to the fork assembly 4. On one end, the removable pin 17 has a circular ring 17*a* extending through a small hole in the pin, keeping it from sliding out of the aligned bores. The circular ring 17*a* is also used to pull out the cylindrical fastener pin 17. On the other end, the pin 17 has a captured ball bearing 17*b* that keeps the pin from sliding out in the other direction. The pin 17 can easily be removed by depressing the ball. This pin fastener 15 allows for quick and easy removal of the steering assembly from the fork assembly.

Many types of mechanical fasteners other than the one illustrated in the drawing and described in detail above could be used to fasten the steering assembly to the fork assembly. Any alternative fastener, however, must provide at least two important functions in keeping with the invention. First, the fastener must allow for articulation between the steering assembly 16 and the fork assembly 4. Specifically, the fastener should allow for free vertical movement of the steering assembly 16 to accommodate the up and down motion of the jack as it travels over rough terrain. In addition, this free vertical movement allows users of different heights to angle the steering assembly 16 at a pitch that presents the handle at a comfortable height. Second, the fastener must provide a rigid connection between the steering and the fork assembly for movement of the steering assembly in a horizontal plane. A rigid connection in a horizontal plane allows the steering forces to be transferred directly to the fork assembly 4 with negligible loss.

Figure 6:
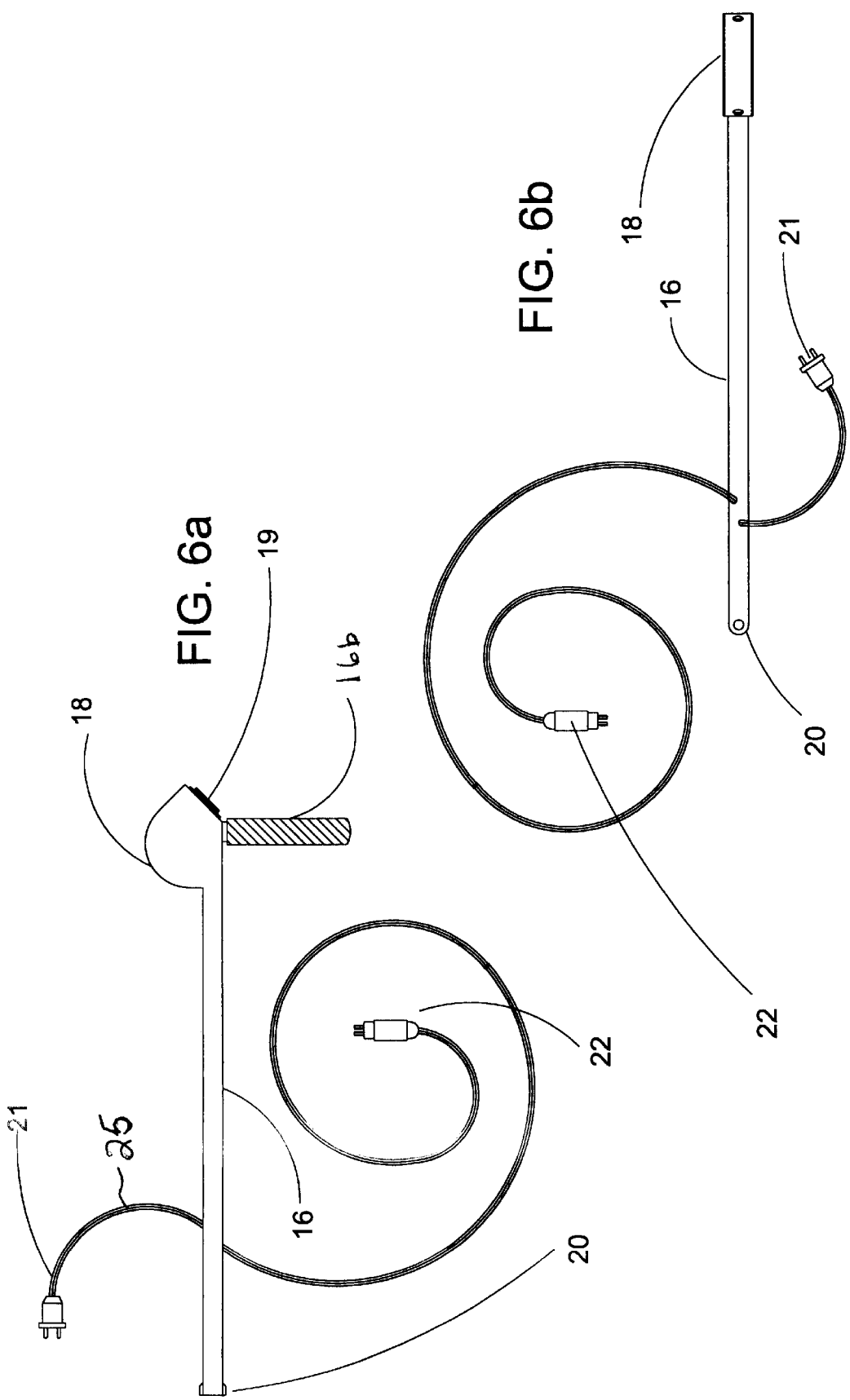
FIGS. 6a and 6b are top and front views, respectively, of the removable steering assembly according to the invention isolated from the swivel jack.

Another important aspect of the invention is the quality of its safety features. In this regard, the steering assembly 16 is removable, as depicted in FIGS. 6*a* and 6*b*, which aids in preventing accidental or unauthorized use of the jack. With the steering assembly 16 removed, the jack can be neither easily energized nor steered. Moreover, when the steering assembly 16 is removed, the DC motor 6 and the associated transmission 23 in effect function as a brake to retard movement of the wheel and tire assembly 5.

The steering assembly 16 is mechanical secured to the fork assembly 4 by the fastener 15 described above, which allows the steering assembly to be de-coupled from the jack. The electrical connector or fastener joining the switch 19 mounted to the steering assembly 16 to the motor 6 driving the jack is a removable connector having a conventional plug/receptacle interface. A wire 25 is threaded inside the steering assembly 16 and serves to connect the motor 6 to a power source such as a DC battery. One end of the wire 25 ends in a plug 21 for mating to the receptacle 12. The other end of the wire 25 ends in a plug 22 for mating with a receptacle connected to a twelve-volt, DC power source 26 (FIG. 7), which can be mounted on either the boat, trailer or towing vehicle. Many types of plugs that properly connect to the power source 26 will suffice, as long as they can be easily and repeatedly connected and disconnected, are rated for the required voltage and amperage and are designed for outdoor use.

In the illustrated embodiment, the plug/receptacle for connecting to the trolling motor power source is, for example, a model 445 receptacle manufactured by Rig-Rite, Incorporated of Warwick, R.I. An exemplary plug 21/receptacle 12 for fastening the wire 25 to the jack is a male watertight deck connection model 190-DR-CHR manufactured by Perko.

Between the two plug/receptacles is a double-pole double-throw ("DPDT") momentary rocker switch 19, such as the Momentary On-Off-Momentary On rocker switch, model 58027-11 built by Cole Hersee of Boston, Mass. The switch 19 is actuated by a user's thumb as the user grips the steering assembly at the handle 17. The three positions of the switch 19 operate the drive wheel 5 in forward, off or reverse. Preferably, an access cover 18 allows the wiring of the switch 19 to be exposed for repair and maintenance. When the trailer is not in use, the steering assembly 16 can easily be removed by simply removing the fastener pin 15, as depicted in FIG. 8. It can then be stowed away.

Because the steering assembly 16 includes the wire that connects the motor to its power source, when the steering assembly is removed, the motor 6 cannot be energized and therefore the transmission cannot be engaged. Absent some way of hotwiring the motor 6 to a power source, the standing trailer is immovable when the steering assembly 16 is removed. This includes when the trailer is on a incline because the worm drive, speed-reducing transmission 23 can use the electrical power to turn the wheel, but not vice versa.

Figure 7:
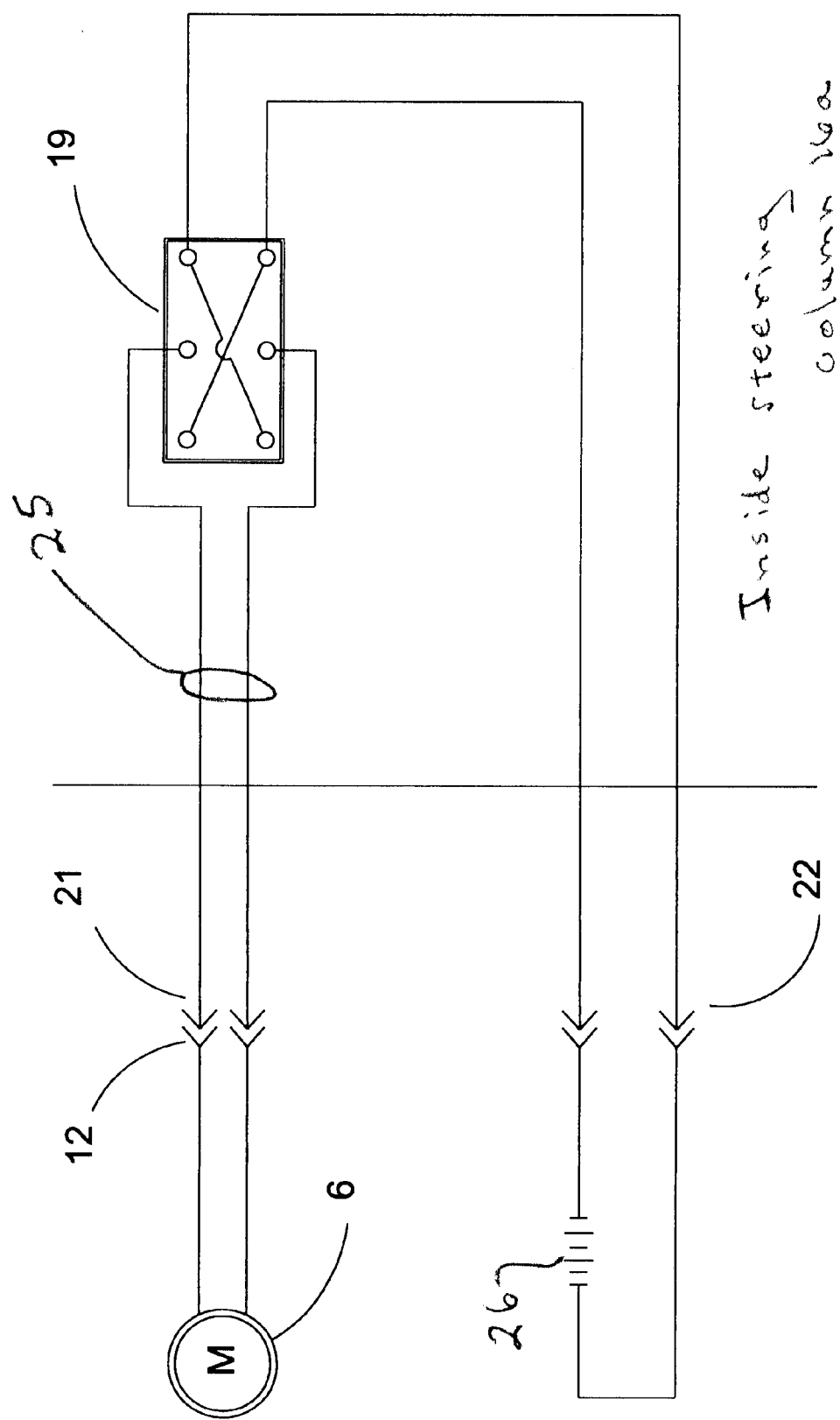
FIG. 7 is an electrical schematic diagram of the control switch incorporated into the steering assembly of FIGS. 6a and 6b.

Referring to the electrical schematic of FIG. 7, the electrical circuit of the swivel jack includes the DC power source 26, the motor 6, the plug 12/receptacle 21 that interfaces the switch 19 to the motor, the plug/receptacle 22 that interfaces the switch to the power source 26 and the switch that connects the motor to the power source. The electric power source is any 12-volt DC power supply supplied by the boat, trailer or towing vehicle. The motor 6 is mounted to the fork assembly 4.

The DPDT momentary rocker switch 19 is located on the handle 16b of the steering assembly 16 for easy user access. Rocking the switch 19 either forward or backward establishes a circuit through the plugs 21/22, switch, power source 26 and motor 6, which delivers electrical energy to the motor, activating the drive wheel arrangement in either forward or reverse. The motor 6 turns the worm gear transmission 23. The transmission 23 drives rotation of the wheel in one direction. Because the switch 19 is a momentary switch, the instant that the user releases the switch it immediately returns to a centered position that is the electrical "off" position, where the circuit is broken and the motor 6 is de-energized.

All of the references cited herein, including patents, patent applications, and publications, are hereby incorporated in their entireties by reference.

In view of the many possible embodiments to which the principles of this invention may be applied, it should be recognized that the embodiment described herein with respect to the drawing Figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

I claim:

1. A swivel jack for driving a trailer when the trailer is detached from a towing vehicle, the swivel jack comprising: a ground wheel and supporting fork assembly; a prime mover for the ground wheel that includes means for braking the ground wheel when power is removed; an extension of the fork assembly for receiving a shaft of the fork assembly such that the shaft freely rotates along its longitudinal axis within the extension; a steering assembly fastened at its one end to the fork assembly at a location below the shaft and free at its other end, where the free end is a handle for a user to apply a torque that is transmitted to the fork assembly, causing the fork assembly to rotate about the shaft's longitudinal axis; and, a switch at the free end of the steering assembly for controlling the prime mover of the wheel.

2. The swivel jack of claim 1 including a fastener for fastening the steering assembly to the fork assembly, which allows the steering assembly to be alternately and repeatedly fastened and removed from the fork assembly.

3. The swivel jack of claim 1 including an electrical plug and socket assembly for providing an electrical connection between the steering and fork assemblies, where the plug and socket assembly provide a connection between the prime mover and a power source by way of the switch.

4. The swivel jack of claim 1 including mechanical and electrical fasteners for allowing the steering assembly to be alternately and repeatedly fastened and removed from the fork assembly, where the fasteners provide both a mechanical connection between the fork assembly and the steering assembly and an electrical connection between the prime mover and its power source with the switch interposed between the prime mover and the power source.

5. The swivel jack of claim 1 wherein the transmission is a worm drive and speed reducing transmission.

6. A swivel jack for driving a trailer when the trailer is detached from a towing vehicle, the swivel jack comprising: a ground wheel, a supporting fork assembly and a motor for driving the wheel, all permanently mounted to the trailer; a mounting assembly for rotating the ground wheel fork assembly and motor between out-of-operation and towing positions, a fastener for connecting a removable steering assembly at its one end to a location on the fork assembly, where a handle at a free end of the steering assembly rotates the fork assembly when a force is applied to the steering assembly; and, a switch at the free end of the steering assembly for controlling application of power to the motor driving the wheel.

7. The swivel jack of claim 6 including an electrical plug and socket assembly for providing an electrical connection between the steering and fork assemblies, where the plug and socket assembly provides a connection between the motor and a power source by way of the switch.

8. The swivel jack of claim 6 including mechanical and electrical fasteners for allowing the steering assembly to be alternately and repeatedly fastened and removed from the fork assembly, where the fasteners provide both a mechanical connection between the fork assembly and the steering assembly and an electrical connection between the motor and its power source with the switch interposed between the motor and the power source.

9. The swivel jack of claim 6 wherein the motor drives the ground wheel through a transmission.

10. The swivel jack of claim 6 wherein the transmission is a worm drive and speed reducing transmission.

11. The swivel jack of claim 6 wherein the fork assembly includes a post that rotates within a support cylinder attached to a tongue of the trailer and the fastener for connecting the removable steering assembly to the fork assembly is located proximate a lower end of the post.

12. A method for parking a trailer, the method comprising the steps of:

pivoting a wheeled swivel jack fixed to the trailer from an out-of-operation position into a towing position, wherein the wheeled swivel jack comprises a ground wheel, a supporting fork assembly, a permanently attached motor and an extension of the fork assembly received by a member secured to the trailer such that the swivel jack freely rotates along its longitudinal axis;

mechanically fastening one end of a removable steering assembly to the fork assembly, while leaving the other end free;

electrically fastening the removable steering assembly to the fork assembly so that a switch on the steering assembly controls the application of power to the motor;

applying power to the motor in order to drive the ground wheel;

steering the swivel jack by moving the steering assembly, causing the swivel jack to rotate about its longitudinal axis so as to move the trailer into its parked position; and disconnecting the steering assembly from the fork assembly while leaving the motor in place when the swivel jack is not in use.

13. The method of claim 12, wherein the step of electrically fastening the removable steering assembly to the fork assembly includes completing an electrical circuit controlled by a switch mounted to the steering assembly.

14. The method of claim 12, further comprising the step of alternately and repeatedly fastening and removing the steering assembly to and from the fork assembly, respectively, in order to repeatedly move and park the trailer.

* * * * *